United States Patent Office 3,505,167
Patented Apr. 7, 1970

3,505,167
FLUORINATED POLYOLEFIN LAMINATES
Walter H. Smarook, Somerville, N.J., assignor to Union
Carbide Corpporation, a corporation of New York
No Drawing. Continuation-in-part of application Ser. No.
504,241, Oct. 23, 1965. This application July 5, 1968,
Ser. No. 742,489
Int. Cl. B32b 27/30
U.S. Cl. 161—189
13 Claims

ABSTRACT OF THE DISCLOSURE

Fluorinated polyolefins laminated to a wide variety of substrates can be fabricated by using carboxyl-containing α-olefin polymers as the bonding agent. This bonding agent can be electrodeposited from the corresponding monovalent salts onto conductive substrates or deposited onto the fluorinated polyolefin lamina from the ammonium salt of the bonding agent.

---

This is a continuation-in-part of application Ser. No. 504,241, filed on Oct. 23, 1965 now U.S. Patent No. 3,410,740 which is a continuation-in-part of application Ser. No. 458,775, filed on May 25, 1965, now abandoned.

This invention relates to laminates of either fluorinated polyolefins bonded to electroconductive substrates coated with electrodeposited carboxyl-containing α-olefin polymers or fluorinated polyolefins coated with carboxyl-containing α-olefin polymers bonded to substrates including both conductive and nonconductive substrates.

Fluorinated polyolefins exhibit several unique properties including resistance to weathering, outstanding mechanical properties and inertness towards a wide variety of chemicals, solvents and staining agents. Four of these fluorinated polyolefins, viz., polyvinyl fluoride, polyvinylidene fluoride, polychlorotrifluoroethylene and polytetrafluoroethylene are particularly worthy of note and have been used to protect various substrate surfaces by forming laminates with them. To obtain strong bonds between these substrates and these fluorinated polyolefins a bonding agent must be used. To date, the agents available for this purpose have not been wholly satisfactory.

It has now been discovered as the first aspect of this invention that electroconductive substrates can be readily bonded to fluorinated polyolefins having up to 4 fluorine atoms per each olefin repeating unit by a method which comprises:

(a) Electrodepositing a carboxyl-containing α-olefin polymer onto an electroconductive anodic substrate from an aqueous bath containing an admixture of water and a salt of a carboxyl-containing α-olefin polymer having monovalent cations, the α-olefin content of said polymer salt being at least 50 mole percent of the total polymer salt;

(b) Surface treating a fluorinated polyolefin having up to 4 fluorine atoms per each olefin repeating unit;

(c) Contacting the substrate having electrodeposited carboxyl-containing α-olefin polymer thereon with the surface treated fluorinated polyolefin; and (d) Applying a pressure of at least 1 p.s.i.g. at a temperature of about 180° C. to 260° C. for at least 0.01 second.

The laminates thus prepared are useful for the fabrication of weather-resistant and solvent-resistant load bearing and decorative structures incorporating the physical properties of the substrate with the chemical inertness of the fluorinated polyolefin.

Although not essential, it is preferred to employ as the carboxyl containing α-olefin polymers of this invention interpolymers of α-olefins having the general formula:

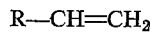

where R is selected from the group consisting of hydrogen and alkyl radicals having up to 10 carbon atoms, the olefin content of said interpolymer being at least 50 mole percent of the total interpolymer and interpolymerized therewith and α,β-ethylenically unsaturated carboxylic acid having one or more carboxyl groups, said unsaturated carboxylic acid constituting up to about 50 mole percent of the total interpolymer.

However, the present invention is not limited to interpolymers derived from the interpolymerization of an α-olefin and an α,β-ethylenically unsaturated carboxylic acid. The starting polymer used to make the polymer salts used in this invention can also be provided by oxidizing olefinic polymers, such as those described in U.S. 3,155,644, by grafting carboxylic acid containing monomers onto an olefin polymer backbone by methods well known in the graft polymerization art such as the method described in U.S. 2,970,129 which are incorporated herein by reference or by grafting monomers such as carboxylic acid derivatives, i.e., esters, anhydrides, amides, nitriles and the like onto an olefin polymer backbone followed by conversion to free carboxylic acid groups after grafting.

Also included within the purview of this invention are halogenated, carboxyl containing α-olefin polymers. The method of introducing the halogen into these polymers is not at all critical and so can be accomplished by first preparing a halogen free interpolymer of, for example, ethylene-acrylic acid and then halogenating that interpolymer by methods well known in the art or by interpolymerizing a halogen containing vinyl monomer with an α-olefin and an unsaturated carboxylic acid. A specific example of this latter class of interpolymers is one obtained by interpolymerizing ethylene, vinyl chloride and acrylic acid. Other examples include interpolymers of ethylene-vinylidene chloride-acrylic acid, ethylene-vinyl chloride-methacrylic acid, ethylene-vinylidene chloride-methacrylic acid, ethylene-vinyl bromide-acrylic acid, ethylene-vinyl bromide-methacrylic acid, ethylene-vinyl fluoride-acrylic acid, ethylene-vinyl fluoride-methacrylic acid, ethylene-vinylidene fluoride-acrylic acid, ethylene-vinylidene fluoride-methacrylic acid, ethylene-vinyl iodide-acrylic acid, propylene-vinyl chloride-acrylic acid, propylene-vinyl chloride-methacrylic acid, propylene-vinylidene chloride-acrylic acid, propylene-vinylidene chloride-methacrylic acid and the like.

As indicated above, the α-olefins preferably employed in the polymers of this invention are α-olefins having the general formula:

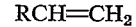

where R is either a hydrogen or an alkyl radical having up to 10 carbon atoms. Thus, suitable α-olefins include, ethylene, propylene, butene-1, pentene-1, hexene-1, neohexene, octene-1, nonene-1, decene-1, 3-methylbutene-1, 4-methylpentene-1, 3-methylhexene-1, 4,4-dimethylhexene-1 and the like. Although polymers of higher olefins can be used, they are not as commercially available or economical as the lower olefins.

The α,β-ethylenically unsaturated carboxylic acids used in the polymers of this invention preferably have 3 to 8 carbon atoms, although those having a greater number of carbon atoms can also be used, if desired. Specific examples include: acrylic acid, methacrylic acid, ethacrylic acid, itaconic acid, maleic acid, fumaric acid, and half esters of the above dicarboxylic acids such as, methyl hydrogen maleate, methyl hydrogen fumarate, ethyl hydrogen maleate, ethyl hydrogen fumarate and the like.

The starting polymers used to make the polymer salts of this invention are not limited to two components. Therefore, additional copolymerizable monomers can be employed together with the olefin and carboxylic acid comonomers. The scope of the starting polymers which can be used is exemplified, although not limited by the following interpolymers:

ethylene/acrylic acid interpolymers,
ethylene methacrylic acid interpolymers,
ethylene/itaconic acid interpolymers,
ethylene/methyl hydrogen maleate interpolymers,
ethylene/maleic acid interpolymers,
ethylene/acrylic acid/methyl acrylate interpolymers,
ethylene/acrylic acid/ethyl acrylate interpolymers,
ethylene/methacrylic acid/methyl methacrylate interpolymers,
ethylene/methacrylic acid/ethyl methacrylate interpolymers,
ethylene/acrylic acid/methacrylic acrylic acid interpolymers,
ethylene/methacrylic acid/methyl acrylate interpolymers,
ethylene/acrylic acid/methyl methacrylate interpolymers,
ethylene/methyl hydrogen maleate/ethyl acrylate interpolymers,
ethylene/acrylic acid/vinyl acetate,
ethylene/methacrylic acid/vinyl acetate interpolymers,
ethylene/propylene/acrylic acid interpolymers,
ethylene/propylene/methacrylic acid interpolymers,
ethylene/maleic acid/ethyl vinyl ether interpolymers,
ethylene/butene-1/acrylic acid interpolymers,
ethylene/neohexene/acrylic acid interpolymers,
propylene/acrylic acid interpolymers,
butene-1/acrylic acid interpolymers and the like.

The polymer salts used in this invention need not be limited to 2 components, i.e., one α-olefin and one unsaturated carboxylic acid salt moiety. Even when the starting polymer is composed of only 2 components, viz., one α-olefin and one unsaturated carboxylic acid, the resultant salt can have 3 or more components. To cite a concrete case in point, an ethylene/acrylic acid interpolymer can be partly neutralized with sodium hydroxide to afford an interpolymer salt consisting of 3 components, viz., ethylene/acrylic acid, and sodium acrylate mers. It will be readily apparent to those skilled in the art that polymer salts containing innumerable combinations of α-olefins and unsaturated carboxylic acids, salts and acid derivatives are contemplated within the purview of this invention.

The carboxyl content of the starting olefin polymer is preferably in the range of about 5 to 25 mole percent of the total polymer although contents of about 1 to 50 mole percent can also be employed, if desired. The starting olefin polymer used to make polymer carboxyl salts in this invention should contain sufficient carboxyl groups of permit the formation of at least water-dispersible salts and preferably water-soluble salts. Solubility increases as the carboxyl salt moiety content of the polymer is increased.

The carboxyl salt moiety content of these polymer salts is preferably about 3 to 25 mole percent of the total polymer salt although other ranges can also be employed, if desired. The term "carboxyl salt moiety" includes both the carboxyl anion and the monovalent cation.

The preferred monovalent cations in the polymer salts of this invention are Na+, K+, Li+ and

wherein each of $R_1$, $R_2$ and $R_3$ is hydrogen or an organic radical, containing up to 10 carbon atoms, which is unsubstituted or substituted with a hydrophilic group such as hydroxyl, amino, imino or cyclic ether groups and wherein two of the organic radicals when taken together form a heterocyclic compound.

The organic radical can be a hydrocarbon radical such as an alkyl, cycloalkyl, aryl, alkaryl or aralkyl radical. Suitable alkyl radicals include methyl, ethyl and isopropyl radicals. Representative cycloalkyl radicals include cyclobutyl, cyclopentyl and cyclohexyl radicals. Representative aryl radicals include phenyl and naphthyl radicals. Among the alkaryl and aralkyl radicals which can be used are benzyl, cumyl, tolyl and xylyl radicals.

Representative substituted hydrocarbon radicals include: ethanolamine, diethanolamine, triethanolamine, ethylene diamine, diethylene triamine, triethylenetetramine, dimethylamino propylamine, diethylamino propylamine, N-(hydroxyethyl)ethylene diamine, N-(2-hydroxypropyl)ethylene diamine and the like.

Representative heterocyclic compounds include piperazine, 2,5-dimethyl piperazine, piperidine, morpholine and the like.

These polymer carboxyl salts can be prepared by neutralizing the starting carboxyl-containing polymer with metal salts, such as carbonates or bicarbonates, metal bases such as hydroxides or alkoxides, amine bases such as trimethyl ammonium hydroxide, monomethyltriethyl ammonium hydroxide, dimethylphenyl ammonium hydroxide and the like, aliphatic amines such as ethanolamine, ethylene diamine, N-(hydroxyethyl)ethylene diamine and the like, cyclic amines such as piperazine, pyridine, piperidine, morpholine and the like, metal alkyls such as sodium ethyl, butyl lithium and the like, metal aryls such as phenyl lithium, potassium naphthalene and the like, hydrides of sodium, potassium or lithium, amides of sodium or potassium, oxides such as sodium peroxide or in the case of alkali metal salts even with the free alkali metal itself. Preferred bases are alkyl ammonium hydroxides, ammonium hydroxide, lithium hydroxide, sodium hydroxide and potassium hydroxide. Any method known in the art can be used to effect this neutralization process.

The concentration of polymer salt in the water-salt bath used for electrocoating conductive substrates is not narrowly critical. A preferred range is about 5.0 to 40% solids by weight with about 5% to 20% being particularly preferred.

Polyvinyl fluoride, polyvinylidene fluoride, polychlorotrifluoroethylene and polytetrafluoroethylene can be prepared by methods well known in the art and described by C. E. Schildknecht on pages 442–4, 472–476, and 484 respectively of "Vinyl and Related Monomers," John Wiley and Sons, Inc., New York, 1952.

The bonding of the coated electroconductive substrate to the fluorinated polyolefin can be easily effected at moderate pressures, e.g., 1 p.s.i.g. and above, and temperatures of about 180° C. to 220° C. The time required to achieve a satisfactory bond is not critical so that any time from about 0.04 second and above can be used. Any conventional press equipment known in the art can be used in both a batch or continuous bonding operation.

Electrodeposition temperature over the range of about 0° C. to about 100° C. is not critical as regards the chemical nature of the electrodeposited interpolymer. Temperature does, however, have a quantitative effect as to the amount of interpolymer deposited on an anodic substrate. This effect varies somewhat with each substrate but in general, there is a minimum amount deposited at about 40° C. with greater amounts deposited above or below this temperature. For reasons of convenience and economy, temperatures of about 20° C. to 30° C. are preferred although any temperatures within the freezing point and boiling point of the bath used can be employed.

Electrodeposition time is not critical since the process is inherently self-regulating. Thus, current flows in general until a continuous insulating coating is deposited on the anodic substrate. When the resistance of this deposited coating exceeds a certain value the current flow essentially ceases. In most cases this point is reached in a fraction of a second as determined with an oscilloscope-camera combination, the oscilloscope having a dual trace feature which allows the simultaneous recording of curves of voltage vs. time and current vs. time during any one deposition. Highly porous anodic substrates will conduct current for longer periods because of the time required for diffusion to conducting surfaces.

Any available source of direct current can be used in the practice of this invention such as a motor-generator unit, batteries, rectified alternating current and the like. It was found convenient to employ direct current obtained by the full-wave rectification of a variable autotransformer controlled 115 volt alternating current, filtered to low residual ripple by a well-known impedance-capacitance arrangement. It is preferred to use a direct current of at least 5 volts D.C. There is no maximum voltage other than that imposed by the heat generated in the salt bath and the efficiency of heat transfer of the system used.

The anodic substrates which can be used in this invention can be metallic or non-metallic as long as the surface is electroconductive. Particularly useful metallic substrates include aluminum, copper, steel, nickel, chromium, mercury and alloys of these as well as tin plate, galvanized screen and the like, as well as metal coated non-conductors such as thin metal coated plastic articles obtained by sputtering, sintering, evaporating, dip coating and other methods well known in the art. Non-metallic conductive substrates including carbon, graphite, graphite cloth and the like, can easily be employed as well as non-conductors coated with non-metallic conducting substrates.

The cathode should, of course, also be electroconductive and its composition is not critical although it preferably should be inert under the reaction conditions used in the electrodeposition process. Several materials which are suitable include lead, stainless steel, carbon, graphite, tin, platinum, rhodium, and the like. The cathode may be used as a simple electrode immersed in the water-salt bath or may be constructed to serve as the cell to contain the bath, or may be in electrical contact with the bath via an ionically permeable membrane, e.g., salt bridge porous plate combination or ionically permeable membrane, without literally touching the bath.

It is essential to preheat the surface of the polyfluoroethylenes prior to its being bonded to a particular coated substrate preferably by exposure to ozone, nitrous oxide, ultra-violet light, gamma irradiation, sodium in liquid ammonia, sodium with naphthalene in tetrahydrofuran and like methods. It is particularly preferred to use sodium in liquid ammonia or sodium with naphthalene in tetrahydrofuran.

It has also been discovered that both electroconductive as well as non-electroconductive substrates can also be bonded to fluorinated polyolefins having up to 4 fluorine atoms per each olefin repeating unit by an alternate process which comprises:

(1) Wetting said fluorinated polyolefin, whose bonding surface has first been pre-treated as explained infra, with an admixture of water and the ammonium salt of a carboxyl-containing α-olefin polymer containing at least 50 mole percent α-olefin;

(2) Drying the wetted, fluorinated polyolefin at a temperature at about 20 to 150° C. for about 45 to 0.125 minutes;

(3) Contacting the dried fluorinated polyolefin with another substrate; and (4) Applying the pressure of at least 1 p.s.i.g. at a temperature of about 86 to 190° C. for about 4 to 0.05 minutes.

The optimum drying times, drying temperatures, laminating temperatures and laminating times depend on the thickness of the components. The above-described method of drying the wetted, fluorinated polyolefin caused a reversion of most of the ammonium salt of the carboxyl-containing α-olefin polymer, as a strongly adhering coating to the fluorinated polyolefin, to the original carboxyl-containing α-olefin polymers. The degree of reversion depends on such variables as the drying time, drying temperature, thickness of both the coating and the fluorinated polyolefin film, diffusion rate of water and ammonia gas ($NH_3$) and the like. However, the degree of reversion under the above-described conditions is sufficient to provide enough free carboxyl groups to afford excellent adhesion to both the fluorinated polyolefin and the substrate or lamina employed to form the laminate structure. It is preferred to carry out the drying operation in a temperature range of 60 to 100° C. although a range of 20 to 200° C. can also be used. A drying time of about 2 to 5 minutes is preferred although ¼ to 45 minutes can also be used if desired, as well as longer times.

While only ammonium salts have been found useful in this second aspect of the invention, any of the carboxyl-containing α-olefin polymers described supra can be used. The recitation of utilities previously given for laminates obtained through the electrodeposited coating technique is equally applicable to the laminates fabricated with the coatings obtained by chemical reversion of the ammonium salts.

The above described process can be used to make laminates of fluorinated poly olefins bonded to metals, synthetic polymers, cellulose, cellulose acetate, regenerated cellulose, proteinaceous materials, natural resins, asphalt, asbestos, vitreous materials, natural fibers, building materials, siliceous materials, and like substrates.

Examples of metal substrates which can be bonded to carboxyl-containing α-olefin polymer coated fluorinated polyolefins include aluminum, chromium, cobalt, copper, gold, iron, lead, magnesium, nickle, platinum, silver, tin, titanium, tungsten, vanadium zinc, and the like as well as alloys such as alloy steel, alnico, brass, bronze, carbon steel, cast iron, chromium steel, Nichrome, pewter, solder, stainless steel, sterling silver, and the like. These metal substrates can be in the form of powders, granules, whiskers, leaves, foils, sheets, wires, bars, rods, and the like.

Vitreous substrates which can be bonded to coated fluorinated polyolefins include glass, glassware, ceramics, clays, enamel, china, porcelain, and the like. Cellulosic substrates which can be bonded to coated fluorinated polyolefins include wood, plywood, sawdust, cane, bamboo, rattan, paper, pressed fiber board, and the like.

Natural resins which can be bonded to coated fluorinated polyolefins include asphalt, bitumen, gums, lacquer, pitch, resin, rubber, shellac, tar, varnish and the like. Synthetic polymer substrates which can be bonded to coated fluorinated polyolefins include thermosetting polymers such as phenol-aldehyde condensation polymers, coumarone-indene polymers, phenol-urea polymers, epoxy resins, melamine resins, as well as laminates of paper, sheets or fibers impregnated with phenolformaldehyde resins or melamine resin, and the like and thermoplastic polymers such as styrene polymers, acrylonitrile polymers, polycarbonates, polyurethanes, polyacetals, polyamides, synthetic rubbers and the like.

Proteinaceous substrates which can be bonded to coated fluorinated polyolefins include leather, hides, furs, pelts, gelatin, and the like.

Natural fiber substrates which can be bonded to coated fluorinated polyolefins include cotton, linen, silk, wool, flax, hemp, jute, manila, sisal and the like.

Building materials substrates which can be bonded to coated fluorinated polyolefins include brick, granite, sandstone, plaster, tile, wallboard, cement blocks, and the like.

In general the nonmetallic substrates which can be bonded to coated fluorinated polyolefins are not limited as to their physical form and can be particulate, granular, fibrous, filamentary, ropey, woven, nonwoven, porous, nonporous, rigid, or nonrigid.

The concentration of the ammonium salt of the carboxyl-containing α-olefin polymer in the water-polymer admixture used for coating the surface treated fluorinated olefin polymer is not narrowly critical. A preferred range is about 5.0 to 40 percent solids by weight with about 5 percent to 25 percent being particularly preferred and about 10 to 20 percent being more particularly preferred. It is preferred to wet the fluorinated olefin polymer with the ammonium salt-water admixture at a temperature at a range of about 20 to 100°C. with 20 to 60°C. being particularly preferred. The method of wetting the fluorinated olefin polymer is not critical and any method known in the art may be used, as for example, dipping, brush coating, wire-drawn coating, spraying, and the like can be used.

The invention is further described by the examples which follow in which all parts and percentages are by weight unless otherwise specified.

EXAMPLES 1–10

Electrodeposition of carboxyl containing α-olefin polymer onto electroconductive surfaces Panels of aluminum (2024–TS 3) 3" x 5" x 0.005" and cold rolled steel 3" x 5" x 0.011" were cleaned and degreased successively with acetone and methylene chloride. In separate experiments the aluminum panels and then the steel panels were immersed in a 20% solids aqueous solution of a 91.88/0.8/7.4 mole percent ethylene/acrylic acid/sodium acrylate terpolymer by suspending them from a clamp attached to the positive lead of a D.C. power supply. The terpolymer solution was confined in a tin plate beaker insulated from the surrounding apparatus and connected to the negative power supply lead. Direct current was obtained by the full-wave rectification of a variable autotransformer controlled 115 volt alternating current, filtered to a low residual ripple by known impedance-capacitance arrangements. The power supply was pre-set to the desired voltage and a switch closing the circuit thrown. In general, a potential of 75–100 volts D.C. was applied across the substrate anode and beaker cathode for about one minute although carboxyl-containing α-olefin polymer was deposited in less than one second for most substrates. The substrate coated with electrodeposited polymer was then removed from the polymer salt solution, washed with a stream of water and dried at 80–120°C. for about 30 minutes. The thickness of the electrodeposited polymer coating ranges from about 1.5 to 20 microns.

Tin, zinc, chromium, copper, nickel, brass, carbon and graphite are also coated with electrodeposited carboxyl-containing α-olefin polymer in the manner described above.

EXAMPLES 11–20

Bonding of conductive substrates coated with electrodeposited carboxyl-containing α-olefin polymer to polyvinyl fluoride Aluminum panels prepared as in Example 1 coated by electrodepositing an ethylene/acrylic acid/sodium acrylate terpolymer thereon were placed face to face with 4" x 6" x 0.002" sheets of polyvinyl fluoride previously treated by immersion in a mixture of sodium (0.4 g.) in anhydrous liquid ammonia (100 g.), between the steam-heated platens of a hydraulic press. A pressure of 1–400 p.s.i.g. at 170–200°C. was applied for about one minute. This simple technique bonded the coated aluminum panel securely to the sheets of polyvinyl fluoride affording laminates with excellent peel strength. A load of 1365 g. per inch was required to peel the film from the laminate. This operation was repeated with the cold rolled steel panels prepared with coatings as in Example 2 and also afforded laminates of coated steel panels with polyvinyl fluoride having peel strength of about 3.0 lbs./inch. As controls uncoated aluminum and cold rolled steel panels were placed in the hydraulic press with sheets of polyvinyl fluoride. No bonding of these components resulted.

Laminates of polyvinyl fluoride with tin, zinc, chromium, copper, nickel, brass, carbon and graphite coated with electrodeposited carboxyl-containing α-olefin polymer as described in Examples 3–10 can be obtained in a similar manner.

*Control.*—Attempts to laminate aluminum or cold rolled steel with a layer of ethylene/acrylic acid copolymer and polyvinyl fluoride sheet were unsuccessful.

EXAMPLES 21–30

Bonding of conductive substrates coated with electrodeposited carboxyl-containing α-olefin polymer to polyvinylidene fluoride Aluminum and cold rolled steel panels coated by electrodepositing an ethylene/acrylic acid/sodium acrylate terpolymer as in Examples 1 and 2 were bonded to sheets of polyvinylidene fluoride 4" x 6" x 0.032" by the bonding technique described in Examples 11 and 12. Laminates of both metals having peel strengths of about 4.14 lbs. per inch were obtained. Uncoated controls did not bond to the vinylidene fluoride sheets.

Laminates of polyvinylidene fluoride, previously immersed in a mixture of sodium (0.4 g.) and liquid ammonia (100 g.), with tin, zinc, chromium, copper, nickel, brass, carbon and graphite coated with electrodeposited carboxyl-containing α-olefin polymer as described in Examples 3–10 can be obtained in a similar manner.

Attempts to laminate aluminum or cold rolled steel with a layer of ethylene/acrylic acid copolymer and a sheet of polyvinylidene fluoride were unsuccessful.

EXAMPLES 31–40

When the experiments described in Examples 1–30 are repeated but with ethylene-acrylic acid or ethylene-methacrylic acid interpolymer salts containing 5 to 25 mole percent of acrylic acid or methacrylic acid interpolymerized therein and containing lithium, potassium, or ammonium cations instead of sodium cations, similar results are obtained.

Peel strengths were measured by applying weights to a peeled back portion of polyvinyl fluoride or polyvinylidene fluoride film laminated to a vertically supported portion of polymer-coated substrate, and by measuring the force required to peel laminate layers with an Instron tensile testing machine.

EXAMPLES 41–42

The general procedures described in Examples 1–10 and 11–20 were used with aluminum panels 5 mils thick to prepare polyvinyl fluoride-aluminum laminates at 220° C. under a pressure of about 40 p.s.i. In these experiments the dwell or contact time, that is, the time interval during which the bonding operation was carried out, was lowered to about 4–5 seconds. By raising the bonding temperature to 240–260° C. contact times of about 0.04 to 0.1 second are sufficient to effect excellent adhesion between aluminum and polyvinyl fluoride.

Continuous in-line bonding of polyvinyl fluoride to aluminum can be carried out by moving sheets of aluminum and polyvinyl fluoride continuously in contact with one another through a heated nip roll.

EXAMPLES 43–54

Cold rolled steel panels 4" x 6" x 0.011" and aluminum panels 4" x 6" x 1/16" were laminated with polyvinyl fluoride following the procedures of Examples 1–10 and 11–20. The resultant laminates were then subjected to various metal-forming operations as a practical empirical test of adhesion. The laminates were subjected to inside bends of 15°, 30°, 45°, and 90° and outside bends of 360°. The laminates were also subjected to indentation or "dimple" tests by impinging a ½" diameter steel ball mounted in an arbor press on laminates placed over a ¾" female die. In all tests there was no delamination observed.

EXAMPLES 55–68

When Examples 41–54 are repeated using polyvinylidene fluoride in place of polyvinyl fluoride similar results are obtained.

EXAMPLES 69–78

Aluminum and cold rolled steel panels coated by electrodepositing an ethylene/acrylic acid/sodium acrylate terpolymer thereon as in Examples 1 and 2 were bonded to sheets of polychlorotrifluoroethylene 2" x 4" x 0.071 to 0.083" by the bonding technique described in Examples 11 and 12. Laminates of both metals having peel strengths of about 4.5 lbs. per square inch were obtained. Uncoated metal controls did not bond to the polychlorotrifluoroethylene sheets.

Laminates of polychlorotrifluoroethylene with tin, zinc, chromium, copper, nickel, brass, carbon, and graphite coated with electrodeposited carboxyl-containing α-olefin polymers by the technique described in Examples 3–10 can be obtained in a similar manner having comparable peel strengths.

EXAMPLES 79–88

Aluminum and cold rolled steel panels coated by electrodepositing an ethylene/acrylic acid/sodium acrylate terpolymer thereon as in Examples 1 and 2 were bonded to sheets of polytetrafluoroethylene 2" x 4" x 0.005 to 0.0.020" by the bonding technique described in Examples 11 and 12. Laminates of both metals having peel strengths of about 4.5 lbs. per square inch were obtained. Uncoated metal controls did not bond to the polytetrafluoroethylene sheets.

Laminates of polytetrafluoroethylene with tin, zinc, chromium, copper, nickel, brass, carbon, and graphite coated with electrodeposited carboxyl-containing α-olefin polymers by the technique described in Examples 3–10 can be obtained in a similar manner having comparable peel strengths.

EXAMPLES 89–98

When Examples 41–54 are repeated using polychlorotrifluoroethylene in place of polyvinyl fluoride similar results are obtained.

EXAMPLES 99–108

When Examples 41–54 are repeated using polytetrafluoroethylene in place of polyvinyl fluoride similar results are obtained.

EXAMPLE 109

A film of polyvinyl fluoride 12" x 12" x 0.001" previously surface-treated by immersion in a mixture of sodium (0.4 g.) in anhydrous liquid ammonia (100 g.) was wire-drawn coated with an 0.5 mil coating of an aqueous solution (20% solids) of an ethylene-ammonium acrylate copolymer obtained by fully neutralizing an ethylene/acrylic acid copolymer containing about 19–20% acrylic acid copolymerized therein and having a melt index of about 330 g./10 min. The polyvinyl fluoride film after drying at about 150° C. was placed in contact with a panel of Formica 6" x 6" (trademark for a plastic finished material made with urea and/or phenol-formaldehyde resins absorbed and cured in a fibrous base) between the platens of a Carver press and pressed together at about 147° C. for about 10 to 12 minutes at a pressure of 1000 p.s.i.g. The press was cooled and a laminate of polyvinyl fluoride to Formica removed. The lamina could not be peeled apart by hand.

EXAMPLE 110

When Example 109 is repeated with the exception that a Micarta (trade name for laminates of paper sheets impregnated with phenol-formaldehyde molding resins) panels are substituted for the Formica panels strong laminates to polyvinyl fluoride are obtained.

EXAMPLE 111

A film of polyvinyl fluoride 12" x 12" x 0.001" was surface-treated as described in Example 109 and wire-drawn coated with an 0.5 mil coating of an aqueous solution (20% solids) of an ethylene/ammonium acrylate copolymer obtained by fully neutralizing an ethylene/acrylic acid copolymer containing about 12.8% acrylic acid copolymerized therein and having a melt index of about 5.5 g./10 min. The polyvinyl fluoride film was dried as described in Example 109 and placed in between the platens of a Carver press in contact with paper which had previously been impregnated with a 40% solution of hexamethoxymethyl melamine in water containing 1% p-toluene-sulfuric acid. The press was closed and a pressure of about 1000 p.s.i.g. was applied for about 10–12 minutes at a temperature of about 147° C. When the press was cooled and opened, a laminate of polyvinyl fluoride to paper impregnated with cured hexamethoxymethyl melamine was revealed. This laminate exceeded the cohesive tear strength of the polyvinyl fluoride film.

EXAMPLE 112

Example 111 was repeated with the exception that a surface-treated polychlorotrifluoroethylene film was substituted for the surface-treated polyvinyl fluoride film. A laminate of comparable peel strength was obtained.

EXAMPLE 113

Example 111 was repeated with the exception that a surface-treated polytetrafluoroethylene film was substituted for the surface-treated polyvinyl fluoride film. A laminate of comparable peel strength was obtained.

Although the invention has been described in its preferred forms with a certain degree of particularity, it is understood that the present disclosure has been made only by way of example, and that numerous changes can be made without departing from the spirit and scope of the invention.

What is claimed is:

1. Article comprising a laminate of a fluorinated polyolefin having from 1 to 4 fluorine atoms per repeating olefin unit bonded with a carboxyl-containing α-olefin polymer to at least one substrate selected from the class consisting of metal, vitreous, synthetic organic polymeric, and cellulosic adherends.

2. Article claimed in claim 1 wherein the carboxyl-containing α-olefin polymer contains at least 50 mole percent ethylene polymerized therein.

3. Article claimed in claim 2 wherein the carboxyl-containing α-olefin polymer contains about 10 to 25 mole percent α,β-olefinically unsaturated carboxylic acid polymerized therein.

4. Article claimed in claim 3 wherein the α,β-olefinically unsaturated carboxylic acid is acrylic acid.

5. Article claimed in claim 3 wherein the α,β-olefinically unsaturated carboxylic acid is methacrylic acid.

6. Article claimed in claim 1 wherein the substrate is a metal.

7. Article claimed in claim 1 wherein the fluorinated polyolefin is polyvinylfluoride.

8. Article claimed in claim 1 wherein the fluorinated polyolefin is polyvinylidene fluoride.

9. Article claimed in claim 1 wherein the fluorinated polyolefin is polychlorotrifluoroethylene.

10. Article claimed in claim 1 wherein the fluorinated polyolefin is polytetrafluoroethylene.

11. Article claimed in claim 7 wherein the substrate is a cellulosic adherend impregnated with a synthetic organic polymeric adherend.

12. Article claimed in claim 11 wherein the synthetic organic polymeric adherend is a cured phenol-aldehyde condensation product.

13. Article claimed in claim 11 wherein the synthetic organic polymeric adherend is a cured melamine resin.

References Cited

UNITED STATES PATENTS

| | | | |
|---|---|---|---|
| 3,238,087 | 3/1966 | Norwalk et al. | 161—185 |
| 3,447,460 | 6/1969 | Vincent et al. | 161—216 X |
| 2,809,130 | 10/1957 | Rappaport | 161—189 X |
| 2,941,912 | 6/1960 | Cox et al. | 161—189 X |
| 3,132,120 | 5/1964 | Graham et al. | 260—78.5 |

HAROLD ANSHER, Primary Examiner

U.S. Cl. X.R.

156—151, 327; 161—216, 252